United States Patent
Chang

(10) Patent No.: US 7,466,684 B2
(45) Date of Patent: Dec. 16, 2008

(54) FRAME SYNCHRONIZATION FOR A MOBILE COMMUNICATION SYSTEM

(75) Inventor: Seok-Il Chang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 812 days.

(21) Appl. No.: 10/977,234

(22) Filed: Oct. 28, 2004

(65) Prior Publication Data

US 2005/0153721 A1   Jul. 14, 2005

(30) Foreign Application Priority Data

Oct. 28, 2003   (KR) ..................... 10-2003-0075593

(51) Int. Cl.
 *H04J 3/06* (2006.01)
(52) U.S. Cl. ..................... 370/350; 370/337; 370/342; 375/150
(58) Field of Classification Search ................. 370/350, 370/479, 503
See application file for complete search history.

(56) References Cited

U.S. PATENT DOCUMENTS

| 7,333,470 | B2 * | 2/2008 | Rimi et al. | 370/350 |
|---|---|---|---|---|
| 2002/0049536 | A1 * | 4/2002 | Gaal | 701/213 |
| 2003/0076812 | A1 * | 4/2003 | Benedittis | 370/350 |
| 2003/0086401 | A1 * | 5/2003 | Lee et al. | 370/337 |
| 2004/0179550 | A1 * | 9/2004 | Naka et al. | 370/479 |
| 2004/0208234 | A1 * | 10/2004 | Naka et al. | 375/148 |
| 2005/0075125 | A1 * | 4/2005 | Bada et al. | 455/525 |
| 2005/0221848 | A1 * | 10/2005 | Chitrapu et al. | 455/502 |
| 2006/0133464 | A1 * | 6/2006 | Demir et al. | 375/150 |
| 2007/0133611 | A1 * | 6/2007 | Li et al. | 370/503 |

FOREIGN PATENT DOCUMENTS

| EP | 1 424 790 A1 | 6/2004 |
|---|---|---|
| WO | WO 03-032512 A1 | 4/2003 |

OTHER PUBLICATIONS

"3GPP TR 25.928: 3rd Generation Partnership Project" Mar. 2001, 3GPP TR 25.928 V4.0.1, pp. 1,14-16,67, XP002236894 *the whole document*.
"Universal Mobile Telecommunications System (UMTS)" Jun. 2003, ETSI Standards, European Telecommunications Standards Institute, Sophia-Antipo, FR, XP014008463 ISSN: 0000-0001 *paragraph [005A]—paragraph [54.1] * paragraph [5A.2.3] * paragraph [5A.3.5]* paragraph [5A.6.1]*.
"Universal Mobile Telecommunications System (UMTS)" Jun. 2002, ETSI Standards, European Telecommunications Standards Institute, Sophia-Antipo, FR, XP01408503 ISSN: 0000-0001 *p. 22*.

* cited by examiner

*Primary Examiner*—Huy D Vu
*Assistant Examiner*—Abdullah Riyami
(74) *Attorney, Agent, or Firm*—Lee Hong Degerman Kang & Waimey

(57) ABSTRACT

Methods and system for frame synchronization for a mobile communication system is disclosed. A downlink synchronization signal is detected. Multiple sub-frames on the basis of the detected synchronization signal are stored. An optimum position of a midamble sequence is detected using a correlation in accordance with sub-frames. A phase sequence of sub-frames is calculated by using a correlation value at the optimum position of the midamble sequence and a maximum correlation value of a synchronization signal. A frame synchronization is obtained on the basis of a phase position of a sub-frame. The frame synchronization is periodically updated.

23 Claims, 5 Drawing Sheets

FIG. 2
RELATED ART

| Name | Phase quadruple $\phi_1 \phi_2 \phi_3 \phi_4$ | Meaning |
|---|---|---|
| S1 | 135,45,225,135 | There is a P-CCPCH in the next 4 sub-frames |
| S2 | 315,225,315,45 | There is no P-CCPCH in the next 4 sub-frames |

FRAME SYNCHRONIZATION FOR A MOBILE COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 10-2003-0075593, filed on Oct. 28, 2003, the contents of which are hereby incorporated by reference herein in their entirety.

BACKGROUND OF THE INVENTION

1. Field of the Invention

The invention relates for frame synchronization of a mobile communication system and, more particularly, to frame synchronization between a mobile terminal and a base station terminal.

2. Description of the Related Art

Mobile communication systems, such as TDMA (Time Division Multiple Access), CDMA (Code Division Multiple Access), and others such as TDSCMA, require synchronization of signals transmitted and received between one or more stations, for example a mobile terminal and a base station terminal.

For TDSCMA, a transmitter system uses phase modulation, such as QPSK (Quadrature Phase Shift Keying) of a downlink pilot signal for synchronization of a transmission frame. The QPSK modulation is a method of transmitting 2 bits of information per symbol that have a phase shift of a carrier wave at an interval of 90.

More specifically, the QPSK modulation divides an input signal into two signal sequences (signals of I,Q channels) by a serial/parallel converter, and modulates each channel signals (I,Q channel signals) by MPSK. The MPSK multiplies the channel signals by two carrier waves (cosine wave and sine wave) having a phase difference of 90 (with each other). The MPSK sends the signals through an adder for combining in one signal. On the other hand, BPSK (Binary Phase Shift Keying) modulation transmits 1 bit information in each symbol. The binary signal is transmitted corresponding to 0 degree phase shift and 180 degree phase shift of a carrier wave.

A receiver of a TD-SCDMA system uses both a training sequence (midamble sequence) and a downlink pilot signal, and performs a phase demodulation to determine the time duration a receiving frame has been delayed due to signal distortions from a communication channel. The receiver of a TD-SCDMA system detects a downlink pilot signal and predicts a midamble distance as being a pre-determined time interval from the detected downlink pilot signal. Frame synchronization is performed using the detected downlink pilot signal and the predicted midamble.

However, in frame structure of many communication systems, such as a TD-SCDMA system, the midamble sequence and the downlink pilot signal are positioned within a predetermined time interval. In the case of severe signal fading of a channel, the predetermined time interval that previously existed between the midamble sequence and the downlink pilot signal may have changed (its position) from that of transmission. This change in position causes increased channel phase error resulting in degraded predictability of the midamble sequence, thereby increasing the probability of frame synchronization failure.

Thus, there is a need for an improved synchronization method and system for mobile communication systems.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to a frame synchronization system and method for mobile communication systems. The frame synchronization system detects a downlink synchronization signal. Multiple sub-frames of the synchronization signal are stored. An optimum position for a midamble sequence is detected utilizing a correlation of the multiple sub-frames. A phase sequence of the multiple sub-frames is calculated using a correlation value of the optimum position of the midamble sequence and a maximum correlation value of the detected synchronization signal.

Frame synchronization is obtained on the basis of a phase position of a sub-frame having the maximum correlation value. The maximum correlation value is calculated from periodically correlating the calculated phase sequence and a defined phase sequence such as a transmission phase sequence. Thereby, the influence of distance between the midamble sequence and the synchronization signal is minimized, increasing the success rate of frame synchronization.

In one embodiment, the method comprises providing a transmission synchronization signal having a pre-determined number of sub-frames and a training signal for correlating communication of a connection. The method further comprises calculating a first phase sequence from an optimum position for the training sequence and for the synchronization signal by a number of the sub-frame, calculating a maximum correlation value between the first phase sequence and a second phase sequence comprising a defined phase sequence, and obtaining a frame synchronization at a phase position of the pre-determined number of sub-frames having the maximum correlation value.

In another embodiment, the training sequence includes a midamble of a first time slot of an arbitrary sub-frame. In another embodiment, the predetermined number is 4. In yet other embodiment, the sub-frames are successively connected.

In yet another embodiment, the step of detecting the optimum position of the training sequence by sub-frames comprises calculating a correlation value between a defined transmission training sequence and the stored training sequence; and detecting a position of the stored training sequence having a maximum correlation value.

In another embodiment, the step of calculating the first phase sequence comprises compensating a phase of a synchronous signal of the optimum position as much as the phase of the training sequence of the optimum position; performing the compensation process on the predetermined number of every sub-frame; and generating the first phase sequence by arranging phases compensated for every sub-frame.

In yet another embodiment, the second phase sequence includes information indicating a synchronization position of a frame.

In another embodiment, the method comprises detecting a synchronization signal having a plurality of sub-frames transmitted from one terminal to another terminal; storing successive sub-frames of the plurality of sub-frames from the synchronization signal at the other terminal; and detecting an optimum position of a midamble sequence to insert into the plurality of sub-frames according to a frame number. The method further comprises calculating a phase sequence utilizing a correlation value of the optimum position of the midamble sequence and a correlation value of the synchronization signal in accordance with the plurality of sub-frames; and obtaining frame synchronization of the transmitted signal on the basis of a phase position of a sub-frame having the maximum correlation value. The phase sequence between the midamble and the transmission sequence is periodically calculated for updating the frame synchronization.

In yet another embodiment, the step of detecting the optimum position of the midamble sequence comprises calculating a correlation value between an arbitrary receiving sequence having a predetermined length and a transmission midamble sequence by the stored sub-frames; and detecting a position of the receiving sequence having the maximum correlation value as the optimum position of the midamble sequence. In one variation of this embodiment of the invention, the transmission midamble sequence is a sequence that a transmitter and a receiver know.

In yet another embodiment, the maximum correlation value of the synchronization signal is a correlation value between the synchronization signal detected by each sub-frame and the transmission synchronization signal in which the transmission synchronization signal is the reference signal known to both a transmitter and a receiver.

In yet another embodiment, the transmission phase sequence includes starting positional information for decoding of a P-CCPCH.

It is to be understood that both the foregoing general description and the following detailed description of the invention are exemplary and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawing, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments

FIG. 2 illustrates a phase sequence for a phase modulation of a downlink synchronization signal for indicating existence or non-existence of a P-CCPCH.

DETAILED DESCRIPTION OF THE PREFERRED EMBODIMENTS

The invention relates to an apparatus and method for frame synchronization of one station with another station, such as a mobile terminal to a base station terminal. Although the invention is illustrated with respect to a mobile communication system, it is contemplated that the invention may be utilized anytime it is desired for transmitting or receiving signals from one location to another location. Well-known functions or constructions are not described in detail since they would obscure the invention in unnecessary detail.

Figure 1:
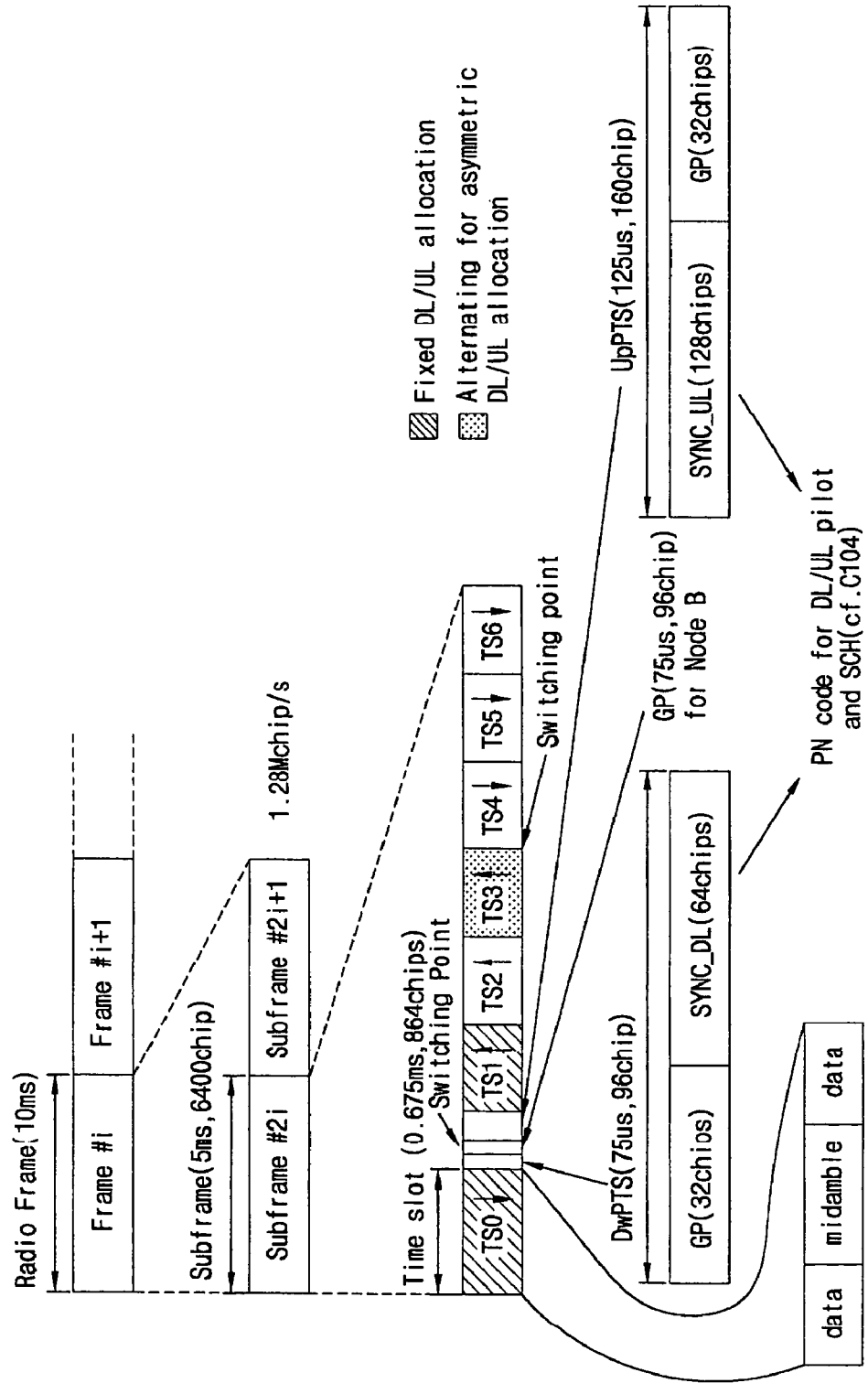
FIG. 1 illustrates a structure of a frame used in a TD-SCDMA system.

Referring to FIG. 1, one radio frame consists of two sub-frames and one sub-frame consists of seven normal time slots (TS0~TS6) and three special time slots which are DwPTS (Downlink Pilot Time Slot), a GP and an UpPTS (Uplink Pilot Time Slot). TS0, TS4, TS5 and TS6 can be used for downlink while TS1, TS2 and TS3 can be used for uplink.

The first time slot TS0 of the sub-frame includes a data field, a midamble field to be used as a training sequence, and a data field. The DWPTS includes a downlink synchronization signal (SYNC_DL). The UbPTS includes an uplink synchronization signal (SYNC_UL). A guard period (not shown) exists between time slots, and 16 chips, for example, can be used for the guard period.

In general, in case of the downlink of the TD-SCDMA system, a mobile terminal uses phase modulation of the downlink synchronization signal (SYNC_DL) sequence to adjust a frame synchronization. In the TD-SCDMA system, two radio frames are basic blocks for interleaving, so commonly the radio frame synchronization is made by using the phase modulation of the downlink synchronization signal (SYNC_DL).

For instance, the P-CCPCH (Primary Common Control Physical Channel: a primary common control channel) is transmitted by being mapped with two radio frames, that is, four sub-frames. Thus, the four sub-frames should be synchronized. A position of the first one of the four sub-frames should be known, to perform a decoding of the P-CCPCH. The P-CCPCH has a data field of the first time slot (TS0) of each sub-frame among the four sub-frames. The P-CCPCH includes a broadcast channel (BCH).

Referring to FIG. 2, downlink synchronization signals (SYNC_DL) of the four sub-frames have a S1 phase sequence, that is, for example, 135, 45, 225, 135, signifying that the P-CCPCH exists in the next four sub-frames. For example, if the downlink synchronization signals (SYNC_DL) of the four sub-frames have a S2 phase sequence, for example, 315, 225, 315, 45, the S2 sequence signifies that the P-CCPCH does not exist in the next four sub-frames.

The transmitter of the TD-SCDMA system phase-modulates a downlink synchronization signal (SYNC_DL) sequence on the basis of the midamble sequence of the first time slot (TS0) of the sub-frame, so that the downlink synchronization signal (SYNC_DL) sequence of the four sub-frames has the corresponding phase sequence (see FIG. 2).

The receiver of the TD-SCDMA system, for example a mobile terminal, detects a phase sequence of the downlink synchronization signal (SYNC_DL) and obtains synchronization of the two radio frames, that is, the synchronization of the P-CCPCH.

Although the mobile terminal detects the phase of the downlink synchronization signal (SYNC_DL), the mobile terminal cannot determine if this is the phase of the transmitted downlink synchronization signal (SYNC_DL) because the channel has distorted the transmitted downlink synchronization signal.

The mobile terminal detects the phase of the downlink synchronization signal (SYNC_DL) sequence using the midamble sequence in the TS0. The mobile terminal compensates the phase of the received downlink synchronization signal (SYNC_DL) using the phase of the midamble sequence to remove the phase influence introduced by the channel.

Figure 3:
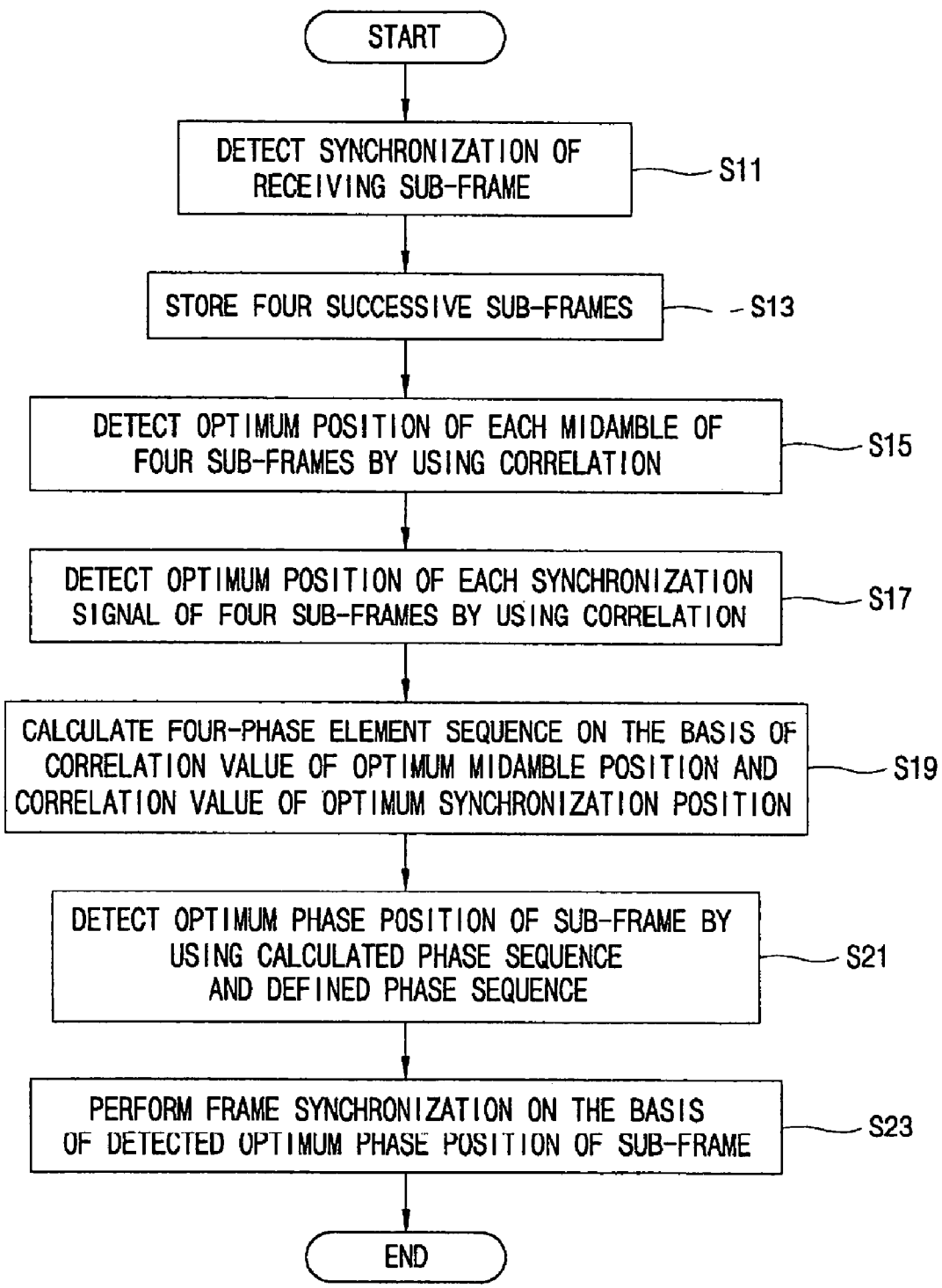
FIG. 3 is a flow chart of a frame synchronization method in a TD-SCDMA system in accordance with an embodiment of the invention.

Referring to FIG. 3, the mobile terminal detects synchronization of the received sub-frame (S11), and stores four successive sub-frames on the basis of the detected synchronization (S13). The mobile terminal detects an optimum position of each midamble of the stored four sub-frames by using a correlation (S15), and detects an optimum position of each downlink synchronization signal of four sub-frames by using the correlation (S17).

The mobile terminal calculates phase sequences of four elements by using the optimum position of each midamble and the optimum position of each downlink The mobile terminal detects an optimum phase position where a correlation value is maximized. The mobile terminal correlates the calculated phase sequence, and a defined phase sequence (transmission phase sequence), and performs frame synchronization on the basis of the optimum phase position that is detected (S21 and S23).

In this manner, the mobile terminal detects the midamble sequence independently from the downlink synchronization signal and unconditionally obtains a position of the midamble sequence distanced at a predetermined interval from the downlink synchronization signal. The mobile terminal detects the synchronization of the sub-frame by detecting the downlink synchronization signal (S11) and stores the four successive sub-frames on the basis of the detected downlink synchronization signal (S13).

If the sub-frame synchronized, a position of the receiving midamble sequence is basically known. In one embodiment of the invention, the position of the receiving midamble sequence is searched one more time by using a correlation with the transmission midamble sequence (transmission phase sequence).

Bellow is an example illustrating the method for detecting a midamble sequence of a first time slot (TS0) of the first stored sub-frame. In this example, the midamble sequence has a predetermined pattern as a training sequence, and the number of elements of the midamble sequence is 144. If a transmission midamble sequence having a specific pattern is $m^T$, the transmission midamble sequence can be expressed by equation (1) shown below. The mobile terminal either knows or easily obtain the transmission midamble sequence.

If a midamble sequence is roughly determinable from the first stored sub-frame. This midamble sequence is taken as a receiving midamble sequence ($m^R$). A receiving midamble sequence can be expressed by equation (2) as shown below:

$$m^T = \{m_1^T, m_2^T, \ldots, m_{144}^T\} \quad (1)$$

$$m^R = \{m_1^R, m_2^R, \ldots, M_{414}^R\} \quad (2)$$

In order to detect an accurate position of the receiving midamble sequence, such as an optimum position, the mobile terminal correlates the transmission midamble sequence $m^T$ and the receiving midamble sequence $M^R$. The mobile terminal searches a position of the receiving midamble sequence $m^R$ having a maximum correlation value, and in this respect, if a correlation value at the searched optimum position is Max_corr$_{Mid}$, it can be expressed by equation (3) shown below:

$$\text{Max\_corr}_{Mid} = \arg\max_{0 \leq i \leq L} \sum_{k=0}^{144} m_{(i+k)\%144}^R \cdot m_k^{T*} \quad (3)$$

wherein 'L' indicates a guard period between time slots, which can have 16 as a maximum value (step S15).

An arbitrary sequence having 144 elements from the first time slot of the first stored sub-frame can be the receiving midamble sequence. The mobile terminal calculates a correlation value between the arbitrary sequence and the transmission midamble sequence having a specific pattern, and extracts the arbitrary sequence having a maximum correlation value.

Meanwhile, since the sub-frame is in a synchronized state, the mobile terminal knows or substantially knows the exact position of the downlink synchronization signal (SYNC_DL) of the first stored sub-frame. The mobile terminal can calculate a correlation value between the transmitted downlink synchronization signal sequence and the receiving downlink synchronization signal (SYNC_DL) sequence. The calculated correlation value becomes the maximum value, which is called Max_corr$_{SYNC\_DL}$ (S17). The mobile terminal knows the transmission downlink synchronization signal sequence.

The mobile terminal calculates a phase of the received downlink synchronization signal by using the Max_corr$_{Mid}$ and Max_corr$_{SYNC\_DL}$. And then, the mobile terminal calculates a phase of the downlink synchronization signal of the first stored sub-frame on the basis of the phase of the midamble sequence of the first stored sub-frame. The phase of the downlink synchronization signal of the first sub-frame is called $P_1$.

In this manner, the mobile terminal calculates phases of downlink synchronization signals of the second, third and fourth sub-frames, and obtains a phase sequence having a length of 4 (S19). The obtained phase sequence can be expressed as RX_Phase_Seq=$\{P_1, P_2, P_3, P_4\}$. The mobile terminal obtains synchronization of the radio frame by using the obtained phase sequence $\{P_1, P_2, P_3, P_4\}$ and a transmission phase sequence $\{\Phi_1, \Phi_2, \Phi_3, \Phi_4\}$ as shown in FIG. 2. The mobile terminal should know the transmission phase sequence $\{\Phi_1, \Phi_2, \Phi_3, \Phi_4\}$.

The mobile terminal periodically correlates the obtained phase sequence $\{P_1, P_2, P_3, P_4\}$ and the transmission phase sequence $\{(\Phi_1, \Phi_2, \Phi_3, \Phi_4\}$. For example, the mobile terminal arranges the obtained phase sequence in $\{P_1, P_2, P_3, P_4\}$, $\{P_2, P_3, P_4, P_1\}$, $\{P_3, P_4, P_1, P_2\}$, $\{P_4, P_1, P_2, P_3\}$, calculates a correlation value between each arranged phase sequence and the transmission phase sequence $\{\Phi_1, \Phi_2, \Phi_3, \Phi_4\}$, and detects a phase position of a sub-frame corresponding a phase sequence having a maximum value as a boundary position of two radio frames. A frame synchronization is obtained (S21 and S23).

By detecting the frame synchronization, the mobile terminal detects the midamble sequence to compensate for channel phase shift separately from the downlink synchronization signal, therefore, the influence of the distance (effects of signal distortion and multipath effects) existing between the downlink synchronization signal and the midamble sequence is minimized.

The frame synchronization method in a mobile communication system (such as a TD-SCDMA system) has many advantages including:

The midamble sequence and the downlink synchronization signal are independently detected, even though the downlink synchronization signal and the midamble sequence are received with a distance changed from a defined distance for the reason of instability of a device of the TD-SCDMA system, the midamble sequence can be accurately detected.

The midamble sequence can be accurately detected, even in a serious fading channel, so that a phase of the downlink synchronization signal can be accurately detected.

Figure 4:
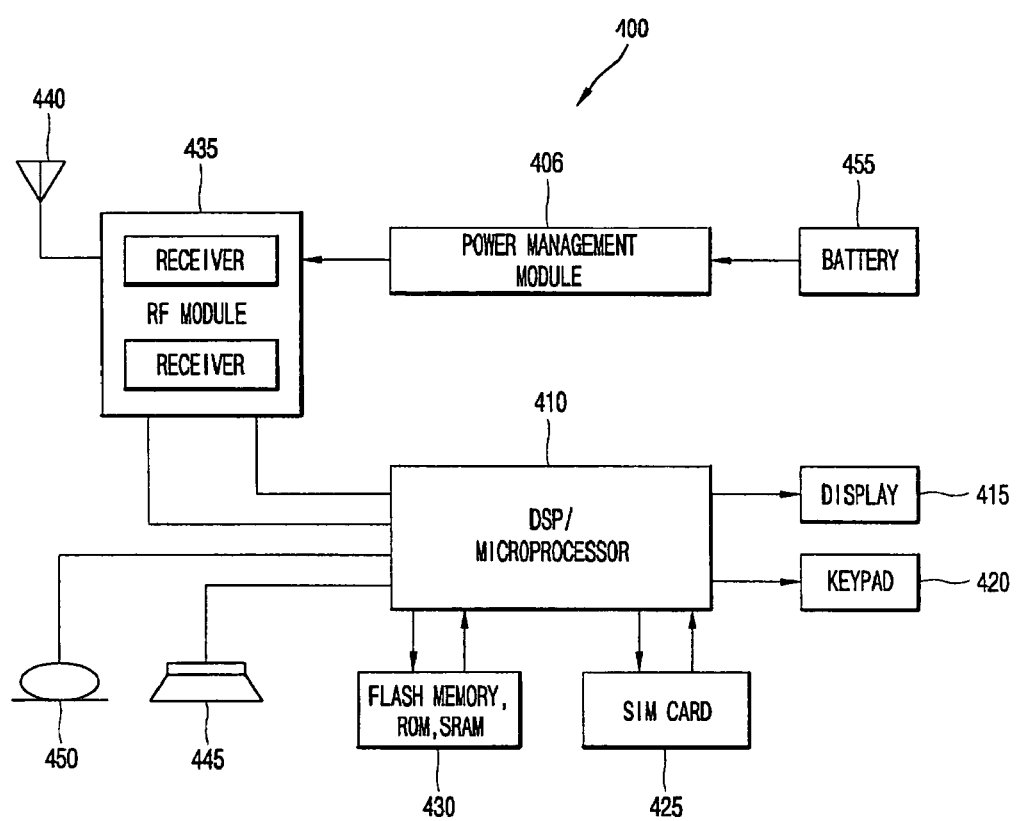
FIG. 4 is a block diagram illustrating a mobile communication device in accordance with an embodiment of the invention.

Referring to FIG. 4, a block diagram of a mobile communication device 400 of the invention such as a mobile phone for performing the methods of the invention. The mobile communication device 400 includes a processing unit 410 such as a microprocessor or digital signal processor, an RF module 435, a power management module 406, an antenna 440, a battery 455, a display 415, a keypad 420, a storage unit 430 such as flash memory, ROM or SRAM, a speaker 445 and a microphone 450.

A user enters instructional information, such as a telephone number, for example, by pushing the buttons of a keypad 420 or by voice activation using the microphone 450. The processing unit 410 receives and processes the instructional information to perform the appropriate function, such as dialing a telephone number. Operational data may be retrieved from the storage unit 430 to perform the function. Furthermore, the processing unit 410 may display the instructional and operational information on the display 415 for the user's reference and convenience.

The processing unit 410 issues instructional information to the RF module 435, to initiate communication, for example, transmit radio signals comprising voice communication data. The RF module 435 comprises a receiver and a transmitter to receive and transmit radio signals. The antenna 440 facilitates the transmission and reception of radio signals. Upon receive radio signals, the RF module 435 may forward and convert the signals to baseband frequency for processing by the processing unit 410. The processed signals would be transformed into audible or readable information outputted via the speaker 445. The processing unit 410 is adapted to perform the methods as illustrated in FIGS. 1-3.

As an example, the processing unit 410 is adapted for storing a predetermined number of successive sub-frames; detecting an optimum position of a training sequence by sub-frames; detecting an optimum position of a synchronization signal by sub-frames; calculating a first phase sequence by using the optimum position of the training sequence and the optimum position of the synchronization signal by sub-frames; calculating a maximum correlation value between the first phase sequence and a second phase sequence as defined; and obtaining a frame synchronization on the basis of a phase position of a sub-frame having the maximum correlation value.

In another embodiment, the processing unit 410 has the training sequence including a midamble of a first time slot of an arbitrary sub-frame. In yet another embodiment of the invention, the pre-determined number of sub-frames are input by a user. In one embodiment of the invention, the predetermined number of sub-frames is 4. In yet another embodiment of the invention, the step of detecting the optimum position of the training sequence comprises calculating a correlation value between a defined transmission training sequence and the stored training sequence; and detecting a position of the stored training sequence having a maximum correlation value.

Other features, as described above in FIGS. 1-3, may be incorporated as well into the processing unit 410.

The processing unit 410 stores the messages received from and messages transmitted to other users in the storage unit 430, receive a conditional request for message input by the user, process the conditional request to read data corresponding to the conditional request from the storage unit. The processing unit 410 outputs the message data to the display unit 415. The storage unit 430 is adapted to store message data of the messages both received and transmitted.

Figure 5:
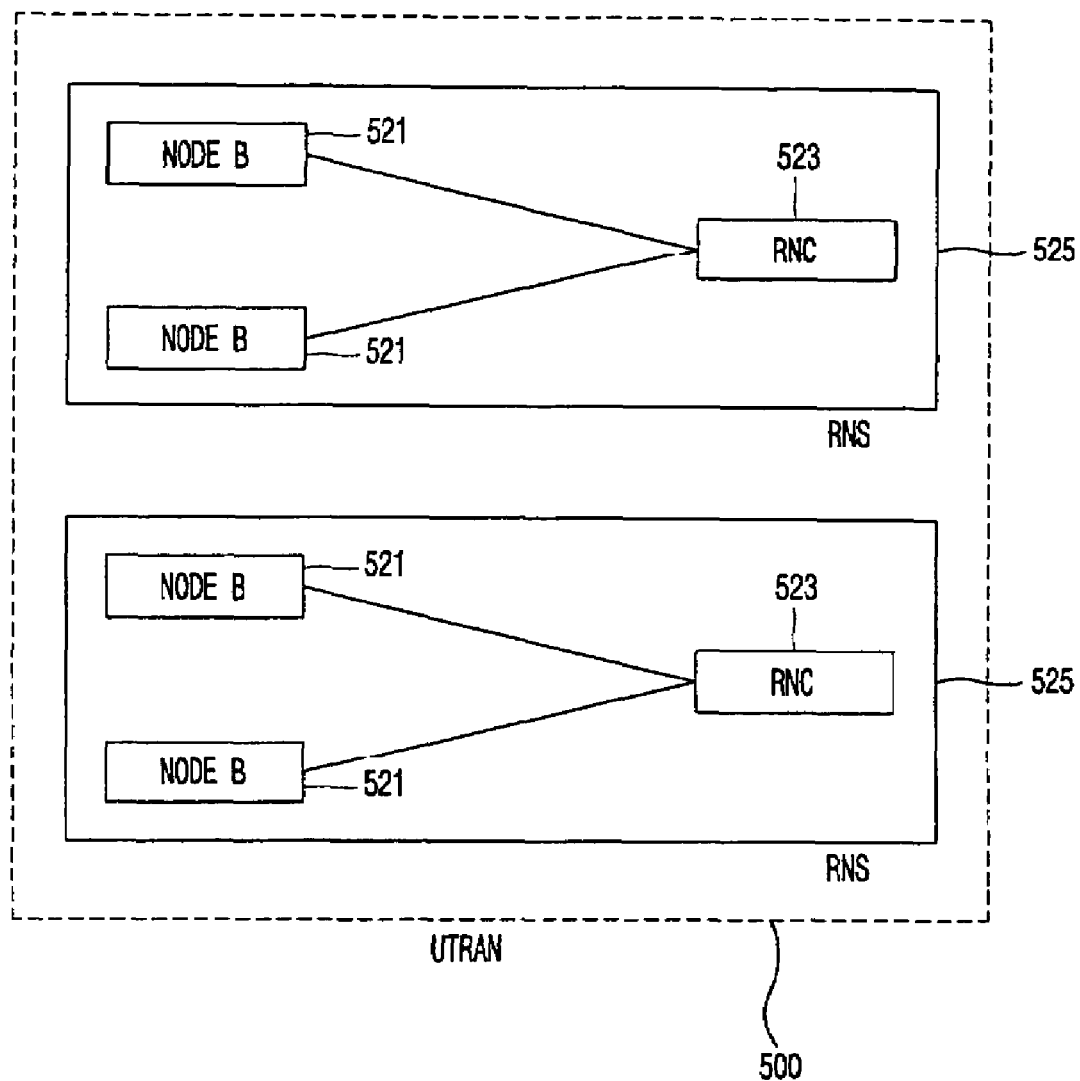
FIG. 5 is a block diagram illustrating a UTRAN in accordance with an embodiment of the invention.

FIG. 5 illustrates a block diagram of a UTRAN 500 according to the preferred embodiment of the invention. The UTRAN 500 includes one or more radio network sub-systems (RNS) 525. Each RNS 525 includes a radio network controller (RNC) 523 and a plurality of Node-Bs (base stations) 521 managed by the RNC. The RNC 523 handles the assignment and management of radio resources and operates as an access point with respect to the core network. Furthermore, the RNC 523 is adapted to perform the methods of the invention.

The Node-Bs 521 receive information sent by the physical layer of the terminal 510 through an uplink, and transmit data to the terminal through a downlink. The Node-Bs 621 operate as access points, or as a transmitter and receiver, of the UTRAN 500 for the terminal. It will be apparent to one skilled in the art that the mobile communication device 400 may be readily implemented using, for example, the processing unit 410 (of FIG. 4) or other data or digital processing device, either alone or in combination with external support logic.

By utilizing the invention, the user of a mobile communication device may store multimedia data as described above in FIGS. 1-3.

As an example, the controller 510 is adapted to detecting a synchronization signal having a plurality of sub-frames transmitted from one terminal to another terminal; storing successive sub-frames of the plurality of sub-frames from the synchronization signal at the other terminal; detecting an optimum position of a midamble sequence to insert into the plurality of sub-frames according to a frame number; calculating a phase sequence utilizing a correlation value of the optimum position of the midamble sequence and a correlation value of the synchronization signal in accordance with the plurality of sub-frames; obtaining frame synchronization of the transmitted signal on the basis of a phase position of a sub-frame having the maximum correlation value; and calculating periodically the phase sequence between the midamble and the transmission sequence for updating frame synchronization.

It will be apparent to one skilled in the art that the preferred embodiments of the invention can be readily implemented using, for example, the processing unit 410 (of FIG. 4) or other data or digital processing device, either alone or in combination with external support logic.

Although the invention is described in the context of mobile communication, the invention may also be used in any wireless communication systems using mobile devices, such as PDAs and laptop computers equipped with wireless communication capabilities. Moreover, the use of certain terms to describe the invention should not limit the scope of the invention to certain type of wireless communication system, such as UMTS. The invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the invention. Moreover, steps may be added to the above described logic and still conform to implementations of the invention.

The foregoing embodiments and advantages are merely exemplary and are not to be construed as limiting the invention. The resent teaching can be readily applied to other types of apparatuses. The description of the invention is intended to be illustrative, and not to limit the scope of the claims. Many alternatives, modifications, and variations will be apparent to those skilled in the art. Accordingly, the invention is not limited to the precise embodiments described in detail hereinabove.

With respect to the claims, it is applicant's intention that the claims not be interpreted in accordance with the sixth paragraph of 35 U.S.C. section 112 unless the term "means" is used followed by a functional statement.

In the claims means-plus-function clauses are intended to cover the structure described herein as performing the recited function and not only structural equivalents but also equivalent structures. Further, with respect to the claims, it should be understood that any of the claims described below may be combined for the purposes of the invention.

What is claimed is:

1. A method to synchronize frames for establishing a connection in a mobile communication system, the method comprising:
   providing a synchronization signal having a pre-determined number of sub-frames;
   providing a midamble sequence for correlating communication in a connection;
   calculating a first phase sequence using an optimum position for the midamble sequence based on the predetermined number of sub-frames and an optimum position for the synchronization signal based on the predetermined number of sub-frames;
   providing a second phase sequence comprising a defined phase sequence;
   calculating a maximum correlation value for a phase position of the pre-determined number of sub-frames using the first phase sequence and the second phase sequence; and
   obtaining frame synchronization using the maximum correlation value of the phase position.

2. The method of claim 1, wherein the midamble sequence includes a midamble of a first time slot of an arbitrary one of the predetermined number of sub-frames.

3. The method of claim 1, further comprising inputting by a user of the mobile communication system the pre-determined number of sub-frames.

4. The method of claim 1, wherein the pre-determined number of sub-frames is 4 and the pre-determined number of sub-frames are successive.

5. The method of claim 1, wherein the optimum position for the midamble sequence and the optimum position for the synchronization signal are determined by:
   storing the midamble sequence;
   calculating a correlation value between a defined transmission training sequence and the stored midamble sequence; and
   detecting a position of the stored midamble sequence having a maximum correlation value.

6. The method of claim 1, wherein calculating the first phase sequence further comprises:
   compensating for a phase shift of the synchronization signal from the optimum position by as much as a phase of the midamble sequence of the optimum position;
   performing a compensation process for each of the pre-determined number of sub-frames; and
   generating the first phase sequence by arranging phases compensated for every sub-frame.

7. The method of claim 1, wherein the second phase sequence comprises information indicating a synchronization position of a frame.

8. A frame synchronization method for establishing connection and for receiving signals from a first terminal to a second terminal of a mobile communication system, the method comprising:
   detecting a synchronization signal having a plurality of sub-frames transmitted from the first terminal to the second terminal, each sub-frame having a midamble sequence;
   storing successive sub-frames of the plurality of sub-frames at the second terminal, each of the stored sub-frames having a frame number;
   detecting an optimum position of a midamble sequence based on a frame number from the stored sub-frames;
   calculating a phase sequence using a correlation value of the optimum position of the midamble sequence based on the stored sub-frames and a correlation value of the synchronization signal based on the stored plurality of sub-frames;
   obtaining frame synchronization on the basis of a phase position of a stored sub-frame having a maximum correlation value calculated by periodically correlating the calculated phase sequence and a defined phase sequence.

9. The method of claim 8, wherein detecting the optimum position of the midamble sequence further comprises:
   calculating a correlation value between an arbitrary receiving sequence having a predetermined length and a transmission midamble sequence according to the number of the stored sub-frame; and
   detecting a position along the arbitrary receiving sequence having the maximum correlation value corresponding to the optimum position for the midamble sequence.

10. The method of claim 9 wherein the mobile communication system includes a transmitter and a receiver and the transmission midamble sequence is a sequence recognized by the transmitter and the receiver.

11. The method of claim 10 wherein the correlation value of the synchronization signal is a maximum correlation value between the synchronization signal detected by each sub-frame and a transmission synchronization signal.

12. The method of claim 11 wherein the transmission synchronization signal is a signal recognized by the transmitter and the receiver.

13. The method of claim 10 wherein the transmission sequence includes starting positional information for decoding of a P-CCPCH.

14. A mobile communication device for managing messages received from and transmitted to another user by a user of the mobile communication device, the mobile communication device comprising:
an RF module comprising a transmitter to send the transmitted messages from a user and a receiver for receiving messages from another user;
means for storing a predetermined number of successive sub-frames;
means for detecting an optimum position of a midamble sequence by sub-frames;
means for detecting an optimum position of a synchronization signal by sub-frames;
means for calculating a phase sequence by using the optimum position of the midamble sequence and the optimum position of the synchronization signal by sub-frames;
means for calculating a maximum correlation value between the phase sequence and a defined phase sequence; and
means for obtaining a frame synchronization on the basis of a phase position of a sub-frame having the maximum correlation value.

15. The device of claim 14, wherein the midamble sequence comprises a midamble of a first time slot of an arbitrary one of the predetermined number of sub-frames.

16. The device of claim 14, wherein the pre-determined number of sub-frames are input by a user of the mobile communication device.

17. The device of claim 14, wherein the predetermined number of sub-frames is 4.

18. The device of claim 14, wherein detecting the optimum position of the midamble sequence further comprises:
calculating a correlation value between a defined transmission midamble sequence and a stored midamble sequence; and
detecting a position of the midamble sequence having a maximum correlation value.

19. A network for radio communication in a mobile communication system, the network comprising:
a transmitter for transmitting a communication signal to a receiver;
means for detecting a synchronization signal having a plurality of sub-frames transmitted from a first terminal to a second terminal;
means for storing successive sub-frames of the plurality of sub-frames at the second terminal, each of the stored sub-frames having a frame number;
means for detecting an optimum position of a midamble sequence based on a frame number from the stored sub-frames;
means for calculating a phase sequence using a correlation value of the optimum position of the midamble sequence based on the stored sub-frames and a correlation value of the synchronization signal based on the stored sub-frames;
means for obtaining frame synchronization of the transmitted signal on the basis of a phase position of a stored sub-frame having a maximum correlation value calculated by periodically correlating the calculated phase sequence and a defined phase sequence.

20. The network of claim 19, wherein the means for detecting the optimum position of the midamble sequence:
calculates a maximum correlation value between an arbitrary receiving sequence having a predetermined length and a transmission midamble sequence according to the number of the stored sub-frame; and
detects a position along the arbitrary receiving sequence corresponding to the maximum correlation value as the optimum position for the midamble sequence.

21. The network of claim 19, wherein the transmission midamble sequence is a sequence recognized by the transmitter and the receiver.

22. The network of claim 19, wherein the correlation value of the synchronization signal is a maximum correlation value between the synchronization signal detected by each sub-frame and a transmission synchronization signal.

23. The network of claim 22, wherein the transmission synchronization signal is a signal recognized by the transmitter and the receiver.

* * * * *